Nov. 11, 1947.　　　　G. W. DE BELL　　　　2,430,602
SAFETY SOCKET FOR TUBULAR LAMPS
Filed Oct. 26, 1944　　　　3 Sheets-Sheet 2
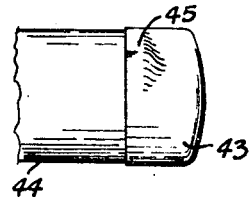
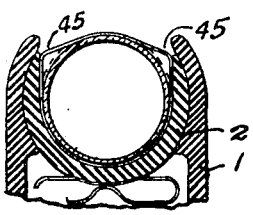
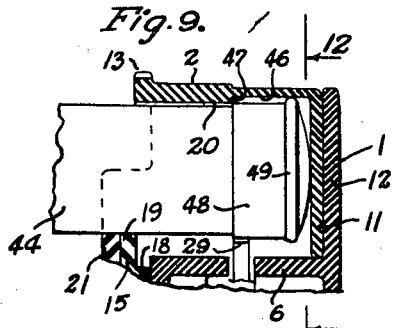
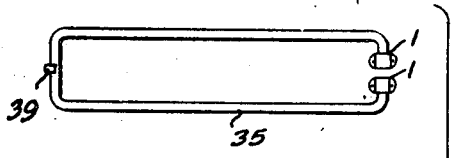
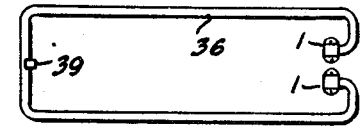
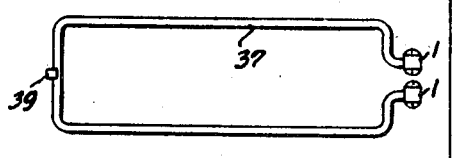
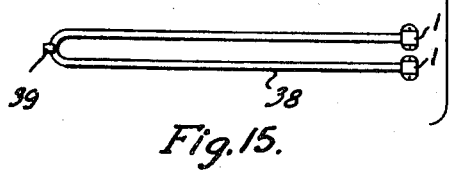
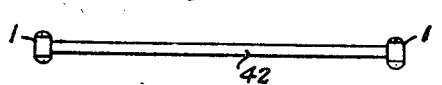
Inventor
George W. DeBell
By Wooster & Davis
Attorneys Nov. 11, 1947.  G. W. DE BELL  2,430,602
SAFETY SOCKET FOR TUBULAR LAMPS
Filed Oct. 26, 1944  3 Sheets-Sheet 3

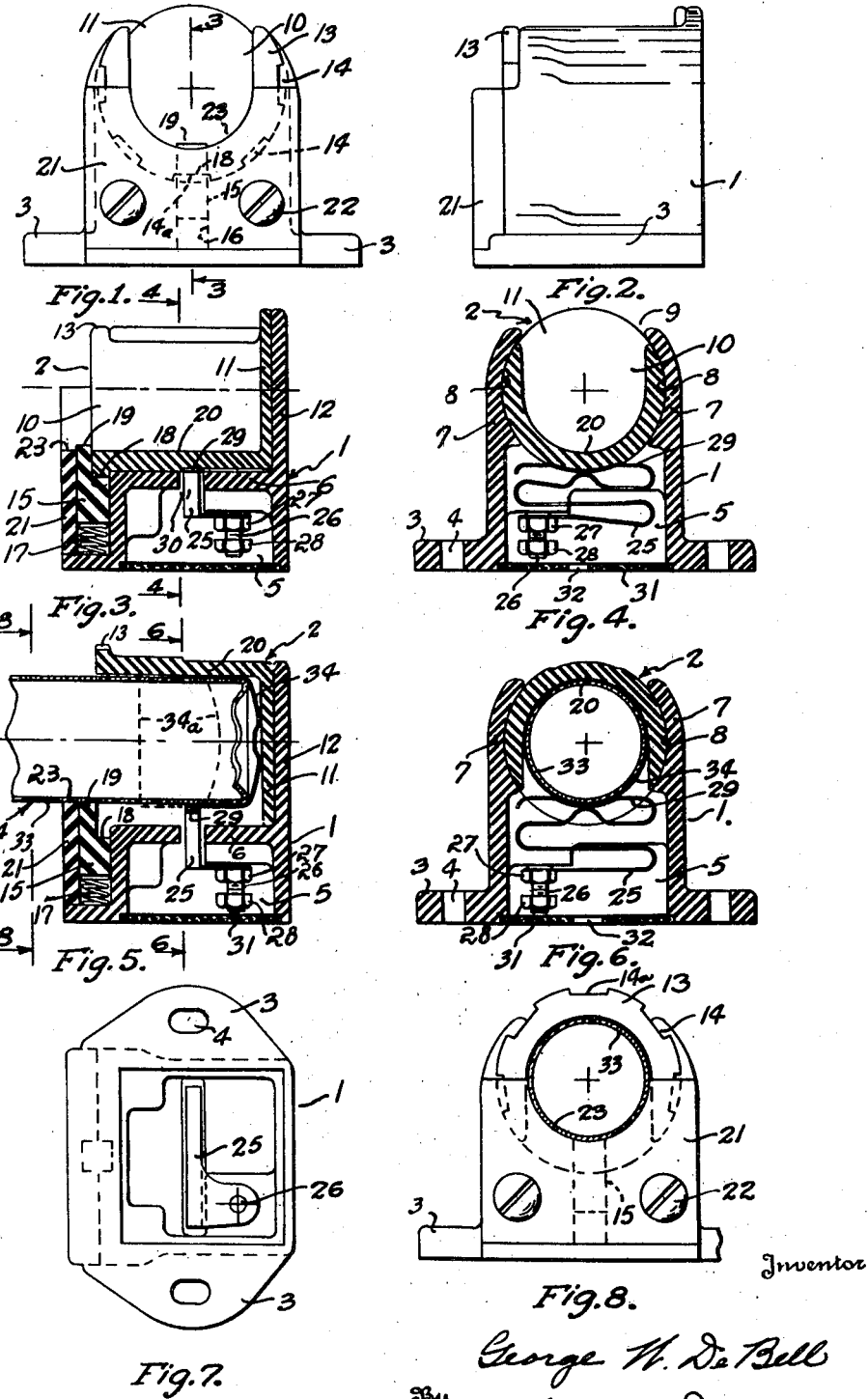

Inventor
George W. DeBell
By Wooster & Davis
Attorneys

Patented Nov. 11, 1947

2,430,602

UNITED STATES PATENT OFFICE 2,430,602

SAFETY SOCKET FOR TUBULAR LAMPS

George W. De Bell, Stamford, Conn.

Application October 26, 1944, Serial No. 560,438

15 Claims. (Cl. 176—29)

This invention relates to safety sockets for tubular lamps, more particularly to mounting and connecting sockets for low voltage cold or hot cathode tubes and tubular lamps, and has for an object to provide an improved simplified construction for mounting the ends of tubular lamps and making electrical connection therewith, which will minimize the possibility of anyone coming in contact with live contacts in the socket either when the tube is removed, or when the tube end is in place in the socket.

Another object is to provide a construction in which the act of removing the tube automatically shields the live parts in the socket from possible external contact by the user. It is a further object to provide a socket in which a straight tube up to eight feet or more in length may be conveniently removed or installed by one person, by handling of the tube near the center thereof, and in which the act of removing it will automatically shield the live parts, and the act of installing it in the fittings will automatically connect the live parts of the tube and the fittings while keeping them shielded and protected.

It is a still further object to provide a socket or fitting which may be employed with various lengths of lamp, lamps of different diameters and of different shapes or arrangements.

With the foregoing and other objects in view, I have devised the construction illustrated in the accompanying drawings forming a part of this specification. It is, however, to be understood the invention is not limited to the specific construction and arrangement shown, but may embody various changes and modifications within the scope of the invention.

In these drawings:

Fig. 1 is a front elevation of the socket with the tube removed and therefore showing it in the open position;

Fig. 2 is a side elevation thereof;

Fig. 3 is a longitudinal central section taken substantially on line 3—3 of Fig. 1;

Fig. 4 is a transverse section substantially on line 4—4 of Fig. 3;

Fig. 5 is a longitudinal section similar to Fig. 3, but showing the end of a tube or lamp in position and the socket in the closed position;

Fig. 6 is a transverse section substantially on line 6—6 of Fig. 5;

Fig. 7 is a bottom plan view of the socket;

Fig. 8 is a section substantially on line 8—8 of Fig. 5;

Fig. 9 is a side elevation of one end of a straight tubular lamp that may be employed with this socket;

Fig. 10 is a transverse view of the upper portion of the socket in the open position similar to Fig. 4, but showing the tube end of Fig. 9 seated in the socket;

Fig. 11 is a longitudinal section of the upper portion of the socket in closed position with the end of a tubular lamp in place and showing a somewhat modified construction;

Fig. 12 is a transverse section substantially on line 12—12 of Fig. 11;

Figs. 13 and 14 are a transverse section and a side elevation of the end of a simple tubular lamp which may be used in the socket, but primarily for use on bent or curved lamps;

Figure 19:
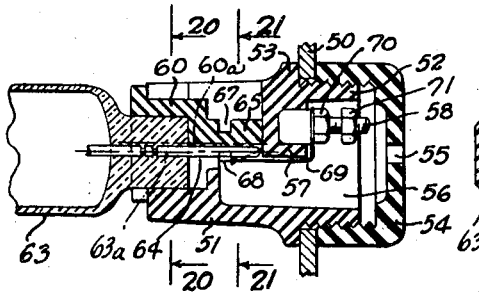
Figure 20:
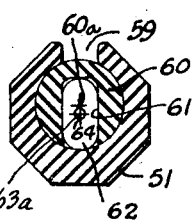
Figure 21:
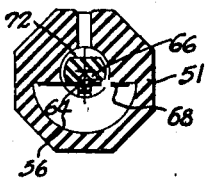
Figure 22:
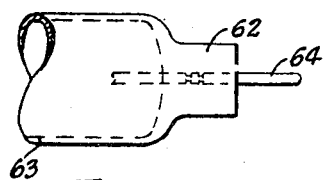
Figure 23:
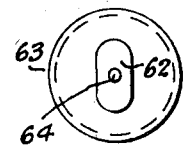
Figure 24:
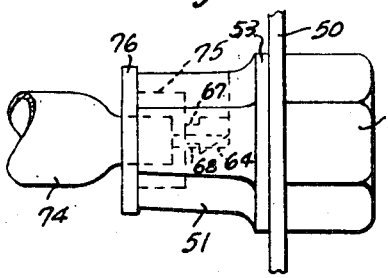
Figures 25, 26:
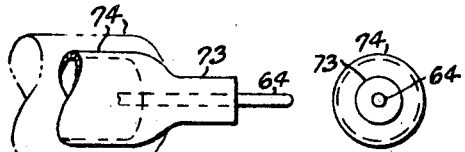
Figure 27:
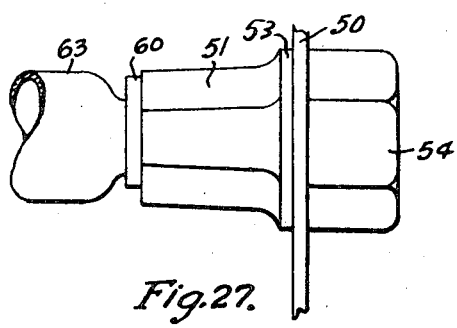
Figure 28:
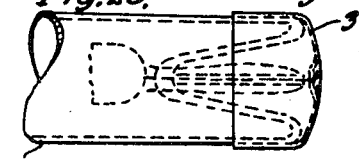
Figure 29:
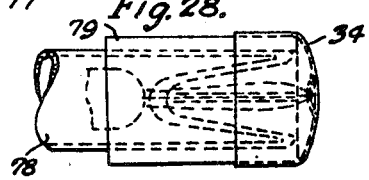
Figure 30:
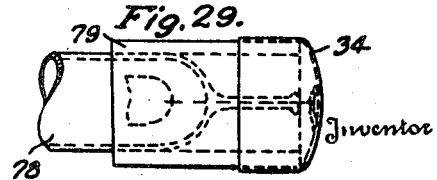
Figure 31:
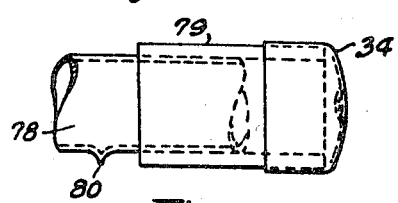

Fig. 15 comprises diagrammatical views of several different shapes of tubular lamps;

Figs. 16 and 17 are a front and a side elevation respectively of a bracket used with the lamps of Fig. 15;

Fig. 18 is a diagrammatical view showing the mounting of a straight tubular lamp;

Fig. 19 is a transverse section through a modified form of socket and tube;

Figs. 20 and 21 are transverse sections substantially on lines 20—20 and 21—21 respectively of Fig. 19;

Fig. 22 is a side elevation of the tube of Fig. 19;

Fig. 23 is an end view thereof;

Fig. 24 is a side elevation of a socket and tube similar to those of Fig. 19 showing a slightly modified construction;

Figs. 25 and 26 are a side elevation and end view respectively of the end portion of the tube of Fig. 24;

Fig. 27 is a side elevation of a similar socket showing a slightly modified construction;

Fig. 28 is a side elevation of the end portion of one type of tube which may be used in this socket, and Figs. 29, 30 and 31 are side elevations of the end portions of tubes of different sizes showing how, by means of an adapter, they can be mounted in the same sockets as the larger tubes.

Even with relatively short tubular lamps of lengths up to eight or sixteen feet, although the voltages may be relatively low, they may be as high as 1500 or 2000 volts, which is sufficiently high to be dangerous, and therefore the live parts of the mounting socket should be covered and protected when the lamp is removed, and also all the live parts of both the lamp and the socket should be covered and protected when the lamp is mounted in position. Further, when the lamp is inserted in or removed from the socket, the contact should not be made between the live parts of the lamp and the socket until such parts of the lamp are covered and protected, and should be broken while they are still so protected. To secure these desirable results I have devised the construction illustrated in the accompanying drawings.

Referring first to Figs. 1 to 8, my improved socket comprises a body 1 and a rotor 2 mounted in the body, these parts being made of insulating material, such for example as a suitable molded plastic material. The base or body 1 may be mounted on any suitable support (not shown). By way of example it is shown with laterally extending mounting lugs 3 provided with an opening 4 for suitable mounting bolts or screws. It is, however, to be understood that this is shown merely by way of example, as the socket may be mounted in any suitable support, such for example as a panel or other means, the body being provided with a corresponding mounting means. Opening from its lower side, the body is provided with a chamber 5 the top of which is the transverse wall 6. Above this wall 6 there are spaced side walls 7 extending upwardly having curved or cylindrical opposed surfaces 8 forming a socket open at the top 9 to receive the substantially cylindrical rotor 2. This rotor is open at one side as shown in Fig. 4 in alignment with the opening 9 in the body when the socket is in the open position, and is also open at one end 10. The other end is closed by the wall 11, and the other end of the socket in the body is closed by the upright wall 12. Adjacent its free open end 10 the rotor is provided with a flange 13 provided with a series of notches 14. Mounted under this flange is a locking block or bolt 15. It may be of insulating material, such as suitable plastic, or other material as desired, and is mounted to slide vertically in a groove 16 provided in the front wall of the body with a spring 17 tending to force the bolt upwardly and hold it against the flange 13. The upper end of this bolt is stepped as shown in Fig. 3 so as to provide a shoulder 18 adapted to seat in the notches 14, more particularly the notch 14a, to lock the rotor 2 against rotation when the socket is in the open position. The other portion 19 of the bolt extends upwardly at the open end of the recess in the rotor and projects a short distance above the bottom wall 20 of this recess, as shown in Fig. 3. The locking bolt 15 and the rotor are retained in position in the socket in the body by means of insulating plate 21 placed over them and secured to the body by any suitable means, such as the screws 22. The upper end of this plate has a curved recess 23 to fit the curvature of a tubular lamp 24 seated in the socket as shown in Fig. 5.

Mounted in the chamber 5 is a spring contact 25. In the arrangement shown it is mounted on a binding post screw 26 mounted on the body by molding it in the material, or by some other suitable means, and the contact is secured to the screw by a nut 27. By means of a similar nut 28 a lead wire (not shown) from the building or other wiring system may be clamped to this binding post screw. This contact 25 is a spring contact of suitable electrical conducting material, such for example as bronze or the like, and may be shaped substantially as shown in Fig. 4, with an upper finger 29 passing through an opening or slot 30 in the wall 6 so as to engage the under side of the rotor or a tubular lamp contact, the resilient action of the spring contact tending to raise this finger or shift it upwardly so that it is depressed by the wall of the rotor. The opening through the bottom of the body to the chamber 5 may be closed by a plate 31 of vulcanized compressed fiber, so as to insulate the device from the mounting on which it may be supported. It has an opening 32 for passage of the lead or cable to the binding post 26.

In Figs. 5, 6 and 8, the end of a tubular lamp 24 is shown in the socket. This lamp comprises a tubular body portion 33 of glass and a metal cap 34 enclosing the end of the glass tube and forming the terminal contact for the lamp, it being electrically connected to the cathode within the tube (not shown) by any of the usual means. In mounting the lamp in the socket this capped end is seated within the open side of the rotor 2 when it is in the open position of Figs. 1 to 4. When the tube end is seated in the rotor it engages the end 19 of the locking bolt 15 and forces it downwardly against the action of the spring 17, and removes the shoulder 18 of this bolt from the notch 14a in the peripheral flange 13 of the rotor. This unlocks the rotor and permits the operator through the flange 13 to rotate the rotor through a half revolution or 180°. This shifts the open side of the socket in the rotor to the under side of the lamp tube, and shifts the closed or bottom wall 20 to a position at the top of the lamp tube, as shown in Figs. 5, 6 and 8. This also moves the bottom wall 20 of the rotor from its position between the lamp and the upper arm 29 of the spring contact 25, permitting this contact to move into engagement with the side of the terminal cap 34 on the end of the lamp tube, thus establishing electrical connection from the supply lead to the cathode within the tube. It will be seen that in this position all the live contacts, such as the spring contact 25 and the lamp contact 34, are completely enclosed and shielded by insulating material so that there is no danger of the operator contacting any of these elements.

In removing the lamp from the socket, the operator turns the rotor from the position shown in Figs. 5, 6 and 8 a half revolution back to the position of Figs. 1, 3 and 4. This may be readily done as the notches in the periphery of the flange 13 provide a good grip. This action again shifts the bottom wall 20 of the rotor into position between the lamp terminal 34 and the spring contact 29, breaking the electrical contact between them, and this is done by the side walls of the rotor before the rotor has been turned sufficiently to expose any portion of the metal terminal cap 34. After the rotor has been turned the half revolution to the position of Figs. 3 and 4, the end of the lamp may be lifted from the socket through the open top thereof. This releases the locking bolt 15, permitting it to move upwardly under action of the spring 17 to again seat the shoulder 18 in the notch 14a in the periphery of the flange in the rotor, locking the rotor against turning movements so that it is not apt to be inadvertently rotated to expose the contact 29.

The length of the metal cap and contact on the end of the tube and the position of the contact spring arm 29 are so proportioned and relatively positioned in the socket that the tube length may vary, as indicated by the dotted lines 34a in Fig. 5, without affecting the functioning of the tube or socket. This will compensate for variations in the length of the tube in manufacture and also allow for expansion and contraction and still maintain proper contact of the metal cap with the spring contact. A typical tube end and cap for this socket is shown in Figs. 13 and 14.

This construction in Figs. 1 to 8, where the rotor tube may be rotated independently of the tubular lamp to release the lamp or secure it in the socket, is intended primarily for bent tubes which, because of their shape, cannot be turned or rotated and cannot be withdrawn longitudinally from the socket, to thus permit withdrawing of the lamp from the socket without turning the rotor to the open position to shield and cover the contact 29. Examples of such bent lamp tubes are shown at 35 to 38 in Fig. 15. In the particular forms shown, the free ends of the tube are adjacent each other and the sockets are therefore mounted closely adjacent. It is therefore preferred to provide some means to support the opposite looped end of the tube, and it will be also seen that as shown by the forms 36, 37 and 38, even the ends of these bent tubes could be removed from the socket by shifting the tubes longitudinally. To prevent this, a bracket or support 39, as illustrated in Figs. 16 and 17 may be employed. This has a base 40 adapted to seat on and be secured in any suitable support or mounting, and has a socket 41 open through one side to receive the looped end portion of the lamp. In the case of the lamp 35, which cannot be shifted longitudinally to remove its ends from the sockets, this bracket may be located either on the inside or outside, but in the case of the lamp 36 it is located on the inside to prevent shifting of the lamp to the right to remove its ends from the sockets, while in the forms 37 and 38 it is located on the outside of the loop to prevent withdrawing of the ends from the sockets by shifting the tubes longitudinally.

In the case of straight tubes, such for example as shown at 42 in Fig. 18, it is preferred to use a socket in which the rotor cannot be rotated independently of the tube, otherwise it might be possible in a long tube for a person to release one end of the tube from its socket by shifting it laterally in the usual manner, and then withdraw the other end by shifting the tube longitudinally, leaving the latter socket with the spring contact 29 exposed. Also, the terminal metal cap on the end first removed would be a live contact. To prevent this, means is provided to prevent turning of the rotor without turning the tube and so turning both sockets to the "off" or open position, or some cooperating means is provided on the tube and socket to prevent withdrawal of the tube from the socket without turning the socket rotor to the open position.

An example of the first arrangement, whereby the rotor cannot be turned independently of the lamp, is shown in Figs. 9 and 10. In this case the socket is the same as shown in Figs. 1 to 8, but the metal cap 43 on the end of the lamp tube 44 is made noncircular or provided with some means to prevent relative turning of the lamp and rotor. In the present case the cap 43 is provided with a pair of outwardly extending beads or lugs 45, so shaped that when the lamp is seated in the recess in the rotor through the open side thereof, these beads or lugs will engage the sides of the rotor, as shown in Fig. 10. Then by turning the lamp through a half revolution or 180°, the rotor is turned through the action of the lamp to the closed position of Figs. 5 and 6, thus enclosing and shielding the metal cap and also permitting the spring contact 29 to engage the metal cap and complete the circuit to the lamp. As the same arrangement will be used on both ends of the lamp tube, the two ends of the lamp will be inserted into their respective sockets and then by merely rotating the lamp a half revolution both sockets are simultaneously turned to the closed or "on" position. Conversely, in removing the lamp, all that is necessary is to rotate it a half revolution in the opposite direction, which action will simultaneously rotate both socket rotors to the open position and simultaneously release both ends of the lamp. The beads, of course, should be in the same relation on each end of the tube so that when the tube is placed in the sockets in open position the beads will rest against the upper edges of the rotors, as shown in Fig. 10. By this arrangement the tube may be handled by a single person at substantially its center and relatively long tubes may be easily handled. Also the tube cannot be released and removed from one fixture without turning the rotor of the other to the "off" or released position.

In Figs. 11 and 12 is shown a modified arrangement for meeting the second conditions noted, whereby although the socket rotor may be turned independently of the lamp tube, cooperating means is provided to prevent withdrawal of the tube from the socket by shifting the tube longitudinally. In this arrangement shown the socket is the same as that shown in Figs. 1 to 8, except the inner portion of the recess in the rotor is relieved or enlarged, as shown at 46, providing a shoulder 47 at its outer end. The lamp tube 44 has a metal cap 48 provided with a peripheral bead 49 adjacent its end, of a diameter substantially that of the recess 46, so that this bead cooperates with the shoulder 47 and prevents withdrawal of the lamp tube from the socket by shifting the lamp longitudinally, and requires turning of the rotor 2 between the open and closed positions in securing and releasing the lamp end, the same as described in connection with Figs. 1 to 8. The cutback or recessed portion 46 is of sufficient length to accommodate variations in the length of the lamp tube due to variations in the manufacture and expansion and contraction, and still have the spring contact 29 engage the side of the cap.

Another arrangement for straight tubes in which the rotor in the socket cannot be turned without turning of the lamp, or conversely, in which the lamp turns the rotors in the sockets, to secure and release the lamp, is shown in Figs. 19 to 23. In this case, instead of a socket having a base to seat on a wall or plain support, it is shown as mounted in a panel. The same mounting can be used for the type of socket shown in Figs. 1 to 8 if desired, or the socket could be provided with ears 3 shown in the form of Figs. 1 to 8 so this socket could be mounted in the same manner. This socket comprises a body member 51 having a threaded portion 52 adapted to pass through an opening in the panel 50 with a flange 53 engaging one side of the panel. A cap or nut 54 is threaded onto the end 52 and securely clamps the socket in the panel, and the body and cap may be noncircular or, for example, hexagonal to facilitate securing them together. These parts are made of insulating material, for example a suitable molded plastic, and the cap may have an opening 55 for entrance of the lead wire (not shown) to the socket. The body 51 is provided with a chamber 56 opening through its inner or rear end, and across the upper part of this chamber is a wall 57 in which may be mounted, as by molding therein, a binding post screw 58. The forward part of this chamber 56 opens through the front of the body and also through the top, as shown at 59. The forward portion of this chamber is cylindrical to receive a cylindrical rotor 60 provided with a noncircular recess 61 opening both through the front and one side of the rotor, the recess in the present case being a substantially rectangular recess or oblong in shape to receive a similarly shaped projection 62 formed on the end of the lamp tube 63. The terminal contact of this tube, instead of being a metal cap embracing the end of the tube as in the previous forms described, comprises a straight wire or rod 64 projecting from the end of the oblong portion 62. Projecting from the cylindrical portion 60 of the rotor is a reduced portion 65 flattened on the side through which the recess 61 opens through the side of the rotor and has a recess 66 to receive the contact 64. Also this extension 65 has a peripheral groove 67 in which the spring arm 68 of a spring contact 69 is adapted to be seated. This contact may be mounted on the screw 58 by any suitable nut 70, and a lead wire may be clamped to this terminal screw by a suitable nut 71.

When not in use the rotor 60 is normally turned to the open position with the open side of the recess 61 in alignment with the side recess 59 in the body. In other words the rotor is turned a half revolution from the position of Figs. 19 to 21. In that position the spring contact 68 is covered by the extension 65 and seats in the groove 67. The bottom of this groove may be flattened as shown at 72 so that the spring will cooperate to retain the rotor in the open position and the spring by seating in the groove 67 prevents the rotor sliding longitudinally out of the body. In mounting of a lamp the noncircular portion or end of the lamp is seated in the recess 61 and then the lamp is rotated a half revolution to the position of Figs. 19 to 21, a turn of the rotor to the position shown bringing the open side of the recess 61 at the bottom of the recess in the body 51, preventing lifting of the lamp tube from the socket. It also brings the open side of the extension 65 to the lower position, as shown in Figs. 19 and 21, so that the spring contact 68 engages the projecting contact 64 of the lamp, completing the circuit to the lamp. This is intended for use primarily with a straight lamp, using the same kind of socket at both ends of the lamp, and permits handling of the lamp at the center thereof so that turning of the lamp will automatically turn the rotors in both end sockets simultaneously to secure or release the lamp. It will be understood that when the rotor is turned to the open position, the contact 68 is shifted away from the lamp contact 64, breaking the electrical connection to the lamp, and it permits removal of the lamp without any danger of the operator contacting a live contact. Also the spring contact 68 is entirely enclosed and shielded while the lamp is removed so that there is no danger of the operator coming inadvertently into contact with it. Further, it will be seen from the drawings that when the rotor is in the closed position with the end of the lamp in place, all the live contacts are fully enclosed and shielded. It is preferred that the rotor be arranged eccentric to the lamp, that is, with its axis or center of rotation 60a spaced somewhat above the axis 63a of the lamp. This tends to prevent inadvertent turning of the lamps and rotors from the closed or "on" position to the released or "off" position.

In Figs. 24, 25 and 26 is shown a socket similar to that of Figs. 19 and 21, but for use with bent lamps, such for example as the shapes shown in Fig. 15. In such arrangements, as previously pointed out, it is necessary that the rotor be capable of being turned independently of the lamp. Therefore, in this case the extension 73 of the lamp tube 74 is made cylindrical instead of oblong as in Fig. 23. Also, the corresponding recess in the rotor 75 corresponding to the rotor 60 is made circular to receive this cylindrical end of the tube, the recess, however, corresponding to the recess 61 opening through the side of the rotor and when the socket is in the open position this open side is in alignment with the opening 59 opening through the top side of the body the same as shown in Figs. 19 to 21. Otherwise this socket is the same as that of Figs. 19 to 21 except that the rotor is concentric with the extension 73, and that the flange 76 at the outer end of the rotor is preferably made of somewhat larger diameter than the body 51 so that it may be more readily grasped for turning it to shift the rotor between the open and closed positions.

Figs. 28 to 31 illustrate typical tube ends for use in this socket, particularly the forms of Figs. 1 to 12. Fig. 28 shows how the metal cap 34 or 43 may be applied to a maximum size ring seal tube 77 and used in the socket the same as the tube 24 or 44, as previously described.

Figs. 29 to 31 show how tubes 78 of smaller diameter of either the ring seal or pinch seal type can be adapted to the same standard socket, Fig. 29 showing a ring seal tube similar to that of Fig. 28 except of smaller diameter, and Fig. 30 showing the pinch seal type. The metal caps 34 are the same in all cases and are of the same diameter to fit in the socket. The end of the glass tube 78 is brought up to the maximum size by means of an adapter 79 comprising a tubular sleeve of suitable insulating material, such for example as molded plastic, which is fitted over and secured to the end of the tube and has an outside diameter corresponding to the size of the larger tube 77, with its outer end embraced by the cap 34. Therefore, the tube end can fit in the socket the same as the tube 28, using the standard metal caps, regardless of the size of the tube, and permitting tube manufacturers to continue with their present methods of sealing, and permitting the use of different sized tubes in the same socket or fixture.

Fig. 31 shows an example of this arrangement using the adapter and the standard cap, but permitting tubulation at the side of the tube, as indicated at 80.

Although the socket has been shown and described as provided with one contact, it will be understood it is not limited to this, as a plurality of contacts could be used in this structure. For example, two binding posts and two contact springs 25 could be readily incorporated longitudinally spaced from each other, and adapted to contact with independent insulated rings in the end cap 34 of the tube, either on the large tubes or the tubes with the insulating adapters of Figs. 29 to 31. This arrangement would be more particularly used where hot cathode tubes are involved, as such tubes require two contacts on each end in order to start the tubes by heating the filaments which are part of the hot cathode method of operation.

It will be seen from the above that this improved socket permits the use of one type of socket for the majority of applications, and will therefore greatly simplify design and reduce the number of types and sizes required.

It will also be seen that the design of the socket is such as to minimize any possibility of anyone touching a live contact when the tube is removed, as the removal of the tube automatically shields the live parts in the socket from possible external contact. Also, when the tube is in place all the live contacts are completely covered and shielded, including the contact on the end of the tube. Furthermore, in rotating the rotor of the socket to the closed position connection is automatically made between the live contact in the socket and the contact or cap on the end of the tube, but this connection is not made until the tube contact is completely covered and shielded. Conversely, turning of the rotor from the closed to the open position to permit removal of the lamp or tube automatically breaks the connection between the live contact in the socket and the tube contact, and this is accomplished before the tube contact is exposed, so that all live contacts are covered and shielded until the electrical connection is broken. In addition, straight tubes of considerable length may be conveniently removed or installed by one person, and it is possible to handle the tube near the center thereof, and the mere act of installing it automatically shields and encloses the live contacts of the tube and the socket, while the act of removing it automatically encloses and shields the live contact of the socket. As the socket extends only slightly beyond the end of the tube, and in addition covers only a short portion of the end of the tube, the overall length of the assembly and the dark area at the end of the tube is minimized. This is important particularly where the tubes are placed end to end. Furthermore, the length of the tube enclosed in the socket is short and not sufficient to interfere with light from the tube.

Having thus set forth the nature of my invention, what I claim is:

1. A lamp socket comprising a body provided with a socket opening through one side thereof for insertion and removal of an end of a lamp having an exposed contact, a member of insulating material mounted in the body for turning movements between open and closed positions and including means to enclose and cover the lamp contact when said member is in the closed position, an electrical contact mounted in the body in position to engage the lamp contact when said member is in the closed position, said member including means to separate the contacts when it is turned to the open position, and releasable means controlled by movement of the lamp into and from the socket for locking the member in the open position.

2. A lamp socket comprising a body provided with a socket opening through one side thereof for insertion and removal of an end of a lamp having an exposed contact, a member of insulating material mounted in the body for turning movements between open and closed positions and including means to enclose and cover the lamp contact when said member is in the closed position, an electrical contact mounted in the body in position to engage the lamp contact when said member is in the closed position, said member including means to separate the contacts when it is turned to the open position and also means to cover the body contact when in this position, a movable bolt, cooperating means on the bolt and the said member to lock the member in open position, and means operable by insertion of a lamp into the socket to shift the bolt to release said member.

3. A lamp fixture comprising a body provided with a socket opening through one side thereof, a rotor of insulating material mounted for turning movements in the body between open and closed positions and provided with a recess opening through one side adapted when the rotor is in the open position to receive an end of a lamp provided with an exposed contact, a contact mounted in the body positioned to engage the lamp contact when the rotor is in the closed position and separated from the lamp contact and covered by said rotor when it is in the open position, means for turning the rotor between the open and closed positions, and means controlled by removal of the lamp from the recess to lock the rotor in the open position and released by insertion of the lamp into the recess.

4. In a device of the character described, a body, a member mounted in the body for turning movements between open and closed positions and provided with a recess opening through one end and a side thereof, a lamp mounted in said recess and provided with an exposed contact, said lamp being insertable in and removable from the recess by lateral movement through the side opening when the member is in the open position, cooperating means on the member and the contact to prevent removal of the lamp from the recess by longitudinal movement, a contact in the body positioned to engage the lamp contact when the member is in the closed position, and said member including means to separate the contacts and cover the body contact when it is in the open position and to retain the lamp against removal through the side opening when the member is in the closed position.

5. In a device of the character described, a body, a member mounted in the body for turning movements between open and closed positions and provided with a recess opening through one end and a side thereof, said recess being shaped to provide a shoulder spaced from its outer end, a lamp with one end mounted in said recess and provided with a metal cap enclosing said end forming a contact and provided with an outwardly extending bead to engage said shoulder to prevent removal of the lamp from the recess by longitudinal movement, said lamp end being removable from the recess by a lateral movement when the member is in open position, a contact in the body positioned to engage the lamp contact when the member is in the closed position, and said member including means to separate the contacts and cover the body contact when it is in the open position and to retain the lamp against removal through the side opening when the member is in the closed position.

6. In a device of the character described, a body, a member mounted in the body for turning movements between open and closed positions and provided with a recess opening through one end and a side thereof, said recess having a bottom wall forming a seat for a lamp end, a lamp having one end seated and mounted in said recess and provided with an exposed contact, said lamp being insertable in and removable from the recess by lateral movement through the side opening when the member is in the open position, cooperating means on the member and the lamp end to turn the member between the open and closed positions by turning movements of the lamp, a contact in the body positioned to engage the lamp contact when the member is in the closed position, and said member including means to separate the contacts and cover the body contact when it is in the open position and to retain the lamp against removal through the side opening when the member is in the closed position.

7. In a device of the character described, a body, a member mounted in the body for turning movements between open and closed positions and provided with a recess opening through one end and a side thereof, a lamp mounted in said recess including a tubular end portion provided with a metal cap enclosing the end and forming an exposed contact, the sides of the cap being provided with outwardly extending lugs engaging the sides of the recess to cause the member to turn with the lamp, said lamp being insertable in and removable from the recess by lateral movement through the side opening when the member is in the open position, a contact in the body positioned to engage the lamp contact when the member is in the closed position, and said member including means to separate the contacts and cover the body contact when it is in the open position and to retain the lamp against removal through the side opening when the member is in the closed position.

8. In a device of the character described, a body, means for mounting the body on a support, a lamp including a noncircular end portion and an exposed contact, a member mounted in the body for turning movements between open and closed positions and provided with a recess opening through one side and an end thereof to receive and form a seat for the end of the lamp, said recess being noncircular to cooperate with the lamp so as to be turned by turning movements of the lamp, a contact in the body positioned to engage the lamp contact when the member is in the closed position, and said member including means to separate the contacts and cover the body contact when it is in the open position and to retain the lamp against removal through the side opening of the recess when the member is in the closed position.

9. In a device of the character described, a body, means for mounting the body on a support, a lamp including a noncircular end portion and an exposed electrical contact projecting therefrom, a member mounted in the body for turning movements between open and closed positions and provided with a similarly shaped recess open at one side to receive and closed on the opposite side to form a seat for the end of the lamp and opening through one side of the member, a contact mounted in the body positioned to engage the lamp contact when the member is in the closed position, and said member separating the contacts and covering the body contact when it is in the open position and covering the lamp contact and retaining the lamp in the recess when the member is in the closed position.

10. In a device of the character described, a body, means for mounting the body on a support, a member mounted in the body for turning movements between open and closed positions and provided with a recess opening through one end and a side thereof, a lamp having an end seated in said recess, said lamp comprising a glass tube smaller than the recess, an adapter comprising a sleeve of insulating material embracing the end of the tube and of an outside diameter substantially that of the recess, a metal cap enclosing the end of the adapter and forming an exposed contact, a contact mounted in the body positioned to engage the lamp contact when the member is in the closed position, and said member separating the contacts and covering the body contact when it is in the open position and covering the lamp contact and retaining the lamp in the recess when the member is in the closed position.

11. In a device of the character described, a tubular lamp comprising a glass tube, a metal cup shaped cap enclosing the end of the tube and forming an exposed contact adapted to engage an electrical contact in a mounting socket in which the lamp end is inserted, and said cap being provided with an outwardly and circumferentially extending bead on its side wall adapted to engage cooperating means in the socket to prevent removal of the lamp from the socket by longitudinal movement.

12. In a device of the character described, a tubular lamp comprising a glass tube, a metal cup shaped cap embracing the end of the tube and provided with a pair of outwardly extending beads in the side walls adapted to engage the side walls of a noncircular recess in a mounting fixture to prevent relative turning of the fixture and the tube, and said cap forming an exposed contact adapted to engage an electrical contact in the fixture.

13. In a device of the character described, a tubular lamp comprising a glass tube, an adapter comprising a sleeve of insulating material embracing the end of the tube and of an external diameter substantially that of a recess to receive the lamp end in a mounting fixture for the lamp, and a metal cup shaped cap embracing the end of the adapter sleeve and forming an exposed contact to engage an electrical contact in the fixture.

14. In a device of the character described, a tubular lamp comprising a glass tube, a metal cup shaped cap embracing the end of the tube and provided with at least one outwardly extending bead in its side wall adapted to engage the wall of a noncircular recess in a mounting fixture to prevent relative turning of the fixture and the tube, and said cap forming an exposed contact adapted to engage an electrical contact in the fixture.

15. In a device of the character described, a tubular lamp provided with a noncircular end portion adapted to seat in a similarly shaped noncircular recess in a mounting socket and held thereby so that the socket cannot turn relative to the lamp, and said end including an exposed contact arranged with its exposed portion outside of and beyond the noncircular portion adapted to engage an electrical contact in the socket.

GEORGE W. DE BELL.

REFERENCES CITED

The following references are of record in the file of this patent:

UNITED STATES PATENTS

| Number | Name | Date |
|---|---|---|
| 258,965 | Weston | June 6, 1882 |
| 1,041,100 | Knowles | Oct. 15, 1912 |
| 2,288,376 | Tuppen | June 30, 1942 |
| 2,233,931 | Alden | Mar. 4, 1941 |
| 2,238,151 | Alden | Apr. 15, 1941 |

FOREIGN PATENTS

| Number | Country | Date |
|---|---|---|
| 524,336 | Germany | May 12, 1931 |
| 461,907 | Germany | July 3, 1928 |
| 138,523 | Austria | Aug. 10, 1944 |
| 650,813 | Germany | Oct. 1, 1937 |
| 541,556 | Great Britain | Dec. 2, 1941 |